June 2, 1964 J. H. HOFFER 3,135,421
CAN BODY
Filed Dec. 22, 1961
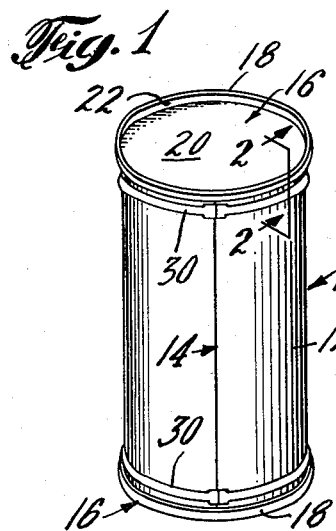
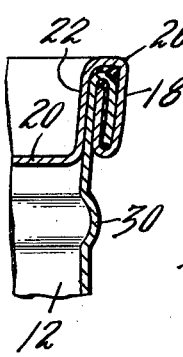
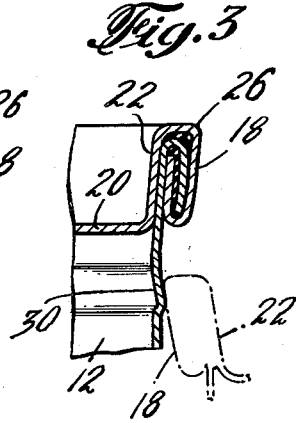
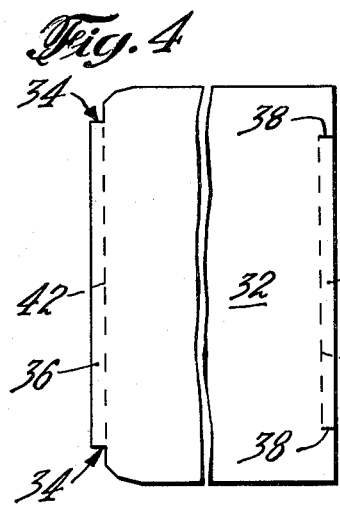
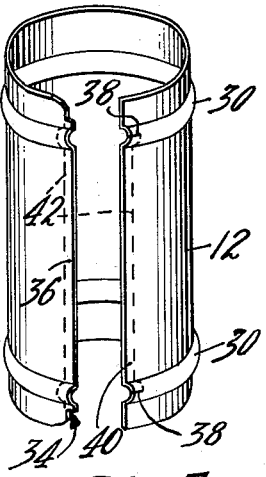
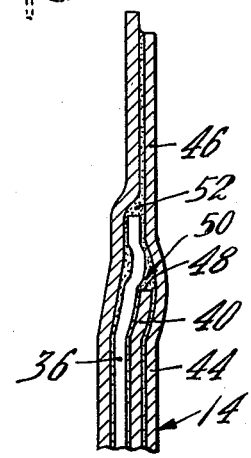
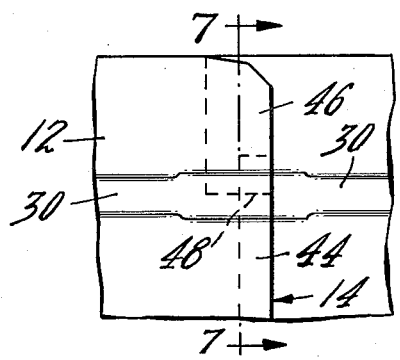
INVENTOR.
JOHN HOWARD HOFFER
BY George P. Ziehmer
George W. Reiber
ATTORNEYS

United States Patent Office 3,135,421
Patented June 2, 1964

3,135,421
CAN BODY
John Howard Hoffer, Wayne, N.J., assignor to American Can Company, New York, N.Y., a corporation of New Jersey
Filed Dec. 22, 1961, Ser. No. 161,586
2 Claims. (Cl. 220—83)

The present invention relates to cans having bodies made from brittle, lightweight material and has particular reference to providing such bodies with cushioning beads adjacent the can end seams to prevent shearing of the can bodies due to collisions between the cans while they are rolling on their sides in gravity runways.

A recent development in the can-making industry has been the introduction of lightweight tin plate for use in the manufacture of cans. At the present time such lightweight plate is commercially available in weights as low as 45 pounds per base box as compared to conventional tin plate wherein the weights range between 75 and 135 pounds per base box.

The new lightweight tin plate is designated as 2CR plate, or alternatively, "double cold reduced" plate, these designations being used to indicate that the thinness of the plate is obtained by means of an additional cold rolling operation. Although it does produce thinner plate, this additional cold rolling operation also produces additional working of the metal and thus increases the temper and brittleness of the plate.

As a result, it has been found that when filled cans having bodies formed of this brittle plate are conveyed in gravity runways wherein they roll on their sides, the pressure exerted by a group of falling cans is sufficient to cause the leading can in the group to shear through and actually perforate the body of a can which has for some reason been stopped in the runway, if the end seam of the moving can hits the body of the stopped can inwardly of its end seam. Conversely, the body of the falling can is sometimes sheared through by the end seam of the stopped can against which it strikes. Obviously, the cans must be laterally offset from each other for this to happen, but the offsetting of cans in such runways is common because the cans must roll freely and cannot be confined too closely in an endwise direction.

It appears that the shearing action occurs because the rigid, countersunk end panel of the sheared can acts as an anvil or die against which its brittle body wall is pressed, with the result that circumferential shearing occurs immediately adjacent this end panel.

This shearing of the can bodies cannot be tolerated in a canning plant, not only because of the resultant spoilage losses and the contamination of the runways by the leaking product, but because, if undetected, it could result in leaky cans getting out into the market.

The present invention provides a solution to this problem by providing the can bodies with cushioning beads which are located adjacent their end seams so that when a collision occurs between cans which are offset from each other, the end seam of one can hits against the cushioning bead of the other can, whereupon the bead partially collapses and in so doing absorbs so much of the energy of the impact that there is not sufficient energy remaining to produce the shearing of the can body.

An object of the instant invention therefore is the provision of a can formed with a lightweight can body which is constructed to absorb the shock of impact when it is struck by the end seam of another can in a can runway.

Another object of the invention is the provision of a can having a body which is made from lightweight plate and is provided with shallow circumferential cushioning beads which are positioned adjacent the ends of the body in the areas which are particularly susceptible to being sheared through when struck by the end seams of other cans.

A further object is the provision of a circumferential cushioning bead which is so located relative to the slit edge of the slit hook of the can body side seam that it utilizes the slit edge as a venting means to prevent the formation of solder voids in the area where the cushioning bead intersects the side seam.

Numerous other objects and advantages of the invention will be apparent as it is better understood from the following description, which, taken in connection with the accompanying drawings, discloses a preferred embodiment thereof.

Referring to the drawings:

FIGURE 1 is a perspective view of a can body provided with circumferential cushioning beads in accordance with the principles of the instant invention;

FIG. 2 is an enlarged vertical section taken substantially along the line 2—2 of FIG. 1;

FIG. 3 is a section similar to FIG. 2 but showing how a cushioning bead collapses to absorb the force of impact when struck by the end seam of another can;

FIG. 4 is a view of a can body blank used to form the can body of the instant invention, parts being broken away;

FIG. 5 is a perspective view of the body blank of FIG. 4 after it has been rolled into tubular form and provided with the cushioning beads, prior to the formation of the side seam;

FIG. 6 is an enlarged view of an end portion of the can body after formation of its longitudinal lock and lap side seam, parts being broken away; and FIG. 7 is a vertical section, on a slightly enlarged scale, taken substantially along the line 7—7 of FIG. 6.

As a preferred and exemplary embodiment of the instant invention, the drawings illustrate a hermetically sealed can 10 which comprises a tubular can body 12 which is circular in cross section and is formed with a soldered longitudinal lock and lap side seam 14. The opposite ends of the can body 12 are sealed by means of a pair of end members 16, the marginal edge portions of which are secured to the marginal end portions of the body 12 in annular multi-layered, interfolded, compound lined end seams 18 which are of the type known in the art as double seams.

Each end member 16 comprises a recessed end panel 20 which is set into an end of the body 12 a distance which is about equal to the longitudinal height of the end seam 18. The panel 20 merges into a substantially vertical annular countersink wall 22 which forms the inner layer of the end seam 18. As best seen in FIGURES 1 to 3, the end seams 18 project radially beyond the outer surface of the can body 12 as well as longitudinally beyond the end panels 20.

As previously mentioned, the can body 12 is circular in cross-section. As a result, a convenient way of conveying such can bodies is to roll them on their sides in inclined runways where they roll under the influence of gravity. In order to permit the cans to roll freely without binding, the runways must be made somewhat wider than the overall height of the cans. As a result, successive cans in the runway are frequently offset laterally from each other a distance which sometimes is just slightly more than the height of a can end seam 18.

Thus, when, as frequently happens, a group of cans rolling at high speed under the influence of gravity drops onto one or more stationary cans which have accumulated in the runway, it is not unusual for the end seam of the leading can in the moving group to hit against the body of the last can in the stationary group just inwardly of its end seam 18, due to the lateral off setting of these colliding cans.

When the can bodies are made of an easily shearable material such as the newly available lightweight tin plate, the force of this impact is sufficient to press the can body 12 inwardly against the outer edge of the recessed end panel 20, which thereupon functions as an anvil or die and causes the body 12 to shear along a circumferentially arcuate line disposed adjacent the bottom of the countersink wall 22.

The body in this area is particularly susceptible to shearing because the adjacent part of the body 12 is held rigidly against movement by the end seam 18, and thus cannot yield under the blow, as a more centrally disposed body portion could. In addition, the tendency for the can body 12 to shear is aggravated by the fact that the can end seams 18 frequently are formed with a small corner radius which gives the seams a fairly sharp edge 26 which concentrates and thus increases the impact pressures between the cans.

In order to eliminate this shearing action, the can body 12 is formed with a pair of shallow, circumferential, projecting beads 30 which are positioned longitudinally inwardly of the recessed end panels 20 in the area which is so susceptible to shearing. As seen in FIGURES 1 to 3, the beads 30 are inwardly spaced from the recessed end panels 20 a distance which is less than the longitudinal height of the end seam 18 (approximately one-third the height of the end seam 18 as seen in FIG. 2), so that when the can body 12 is struck by the end seam 18 of an adjacent can in a can runway, the impact is received by the cushioning bead 30, as best seen in FIG. 3.

As a result of this impact, the cushioning bead partially collapses at the point of impact, as seen in FIG. 3, and in collapsing absorbs most of the kinetic energy of the moving can. The remaining, unabsorbed energy is not sufficient to cause shearing of the can body 12. Thus the shearing problem is completely eliminated. It has been found that the depth of the beads 30 need not exceed .015″ to produce the desired cushioning effect. Such beads do not project outwardly as far as do the end seams 18. It would be undesirable to have the beads 30 project beyond the end seams 18 since in such case they would be unsightly and subject to continuous abrasion due to the fact that adjacent cans constantly bump into each other during handling and storage, and it is preferable to have these normal numerous collisions occur between the can end seams 18.

The cushioning beads 30 are positioned closely adjacent the end seams 18 of the can 10 so that the end seams of another can cannot strike the can body 12 between the beads 30 and the end seams 18. It is of course possible, in theory at least, for the end seam of another can to strike the body 12 inwardly of either cushioning bead 30 but in practice this is very unlikely since the end guides in the can runways would prevent the rolling cans from being offset a sufficient distance to permit this to happen. Furthermore, even if the body were struck in the area inwardly of the cushioning beads 30, a shearing action would not occur since the body would dent rather than shear, inasmuch as it is not supported in this area by the end seam 18.

FIG. 4 illustrates a flat blank 32 from which the can body 12 is made. One longitudinal edge of the blank 32 is appropriately notched as at 34 to set off a first or inner body hook 36 while the opposite edge of the blank 32 is formed with a pair of slits 38 which set off a second body hook 40 which is known as the slit hook or outer hook. The notched and slit blank 32 is then formed into tubular form, preferably in a roll form bodymaker which simultaneously forms the cushioning beads 30 in it. The slits 38 are preferably so located that they coincide with the center lines of the beads 30 for a reason which will hereinafter be explained. This roll forming and beading may be performed in the manner described in United States Patent No. 2,430,010 issued in the name of Nelson Geertsen. The body hooks 36, 40 are then edged, or bent reversely in opposite directions along the lines 42 (see FIGS. 5) and are interlocked and bumped in the usual manner to form the side seam 14 which has a central lock portion 44 and a lap portion 46 disposed at each end of the lock portion 44. In this side seam 14, the slit hook 40 is disposed outwardly of the hook 36, and its short circumferential edges 48, which are created by the slits 38 and thus may be designated as the slit edges of the hook 40, are centered with regard to the beads 30.

The bumping operation is preferably formed by the straight bumping hammer. As a result, the bead 30 in the area in which it crosses the side seam 14 is somewhat flattened. However, because of the temper and resiliency of the plate from which the can body 12 is formed, the flattening of the bead in this area is not complete, and a fairly large open space 50 remains in this bead area. Thereafter, the side seam 14 is soldered in the usual manner by means of a rotating solder roll of the type described in United States Patent 2,294,422 issued to John G. Reid which applies molten solder to the outside of the seam. This solder 52 is distributed throughout the seam between the closely spaced seam parts by capillary action, and drives the air in the seam ahead of it into the inside of the can body, and then solidifies to form a hermetic seal. Because of the large amount of air which is present in the open space 50, it has been found that solder voids or air pockets composed of air which does not escape to the inside of the can appear in the solder in this portion of the side seam 42 if the slit edges 48 of the slit hooks 40 are not centered in the beads 30, thus causing defective side seams. However, by locating the slit edges 48 substantially on the center lines of the beads 30, as previously described, these solder voids virtually disappear and a hermetic side seam is assured. This result apparently is produced because the slit edges 48 of the slit hook 40 function as vents which permit the air which is present in the open spaces 50 of the side seam to escape to the inside of the can body 12.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A can, comprising in combination a tubular can body,
   a pair of end members for sealing the opposite ends of said can body,
   each of said end members being formed with a recessed end panel which extends inwardly into an end of said can body,
   each of said end members being secured to an end of said can body in a multi-layered double seam which projects longitudinally beyond said recessed end panel and radially beyond said can body,
   and a radially projecting circumferential cushioning bead formed in each end of said can body and located longitudinally inwardly of its respective recessed end panel a distance which is approximately one-third the longitudinal height of said double seams,
   said cushioning beads extending radially beyond the surface of said can body a distance less than the distance which the said double seams project beyond said body and being deformable when struck by the double seam of another can to cushion the shock of impact to thereby prevent shearing of said can body against said recessed end panel.

2. A can, comprising in combination a tubular can body having a lock and lap side seam,
- a pair of end members for sealing the opposite end of said can body,
- each of said end members being formed with a recessed end panel which extends inwardly into an end of said can body,
- said side seam including a slit hook having a pair of slit edges which are positioned longitudinally inwardly of said recessed end panels,
- each of said end members being secured to an end of said can body in a multi-layered double seam which projects longitudinally beyond said recessed end panel and radially beyond said can body,
- and a radially projecting circumferential cushioning bead formed in each end of said can body and located longitudinally inwardly of its respective end panel a distance which is less than the longitudinal height of said double seams,
- said circumferential cushioning beads intersecting said side seam and being centered on said slit edges of the slit hook,
- said cushioning beads extending radially beyond the surface of said can body a distance less than the distance which said double seams project beyond said body and being deformable when struck by the double seam of another can to cushion the shock of impact to thereby prevent shearing of said can body against said recessed end panel.

References Cited in the file of this patent

UNITED STATES PATENTS

| Re. 3,757 | Wilson | Dec. 7, 1869 |
| 2,814,416 | Campbell | Nov. 26, 1957 |
| 2,893,592 | Atkinson | July 7, 1959 |